May 19, 1964 — E. W. BARTH — 3,134,040
DYNAMOELECTRIC MACHINES WITH PROTECTION
FOR SQUIRREL CAGE EXPANSION
Filed June 7, 1960
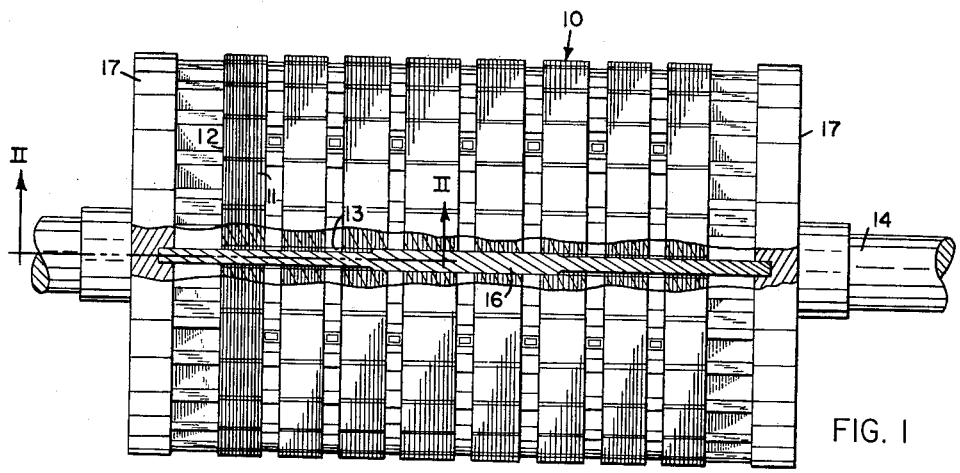
FIG. 1
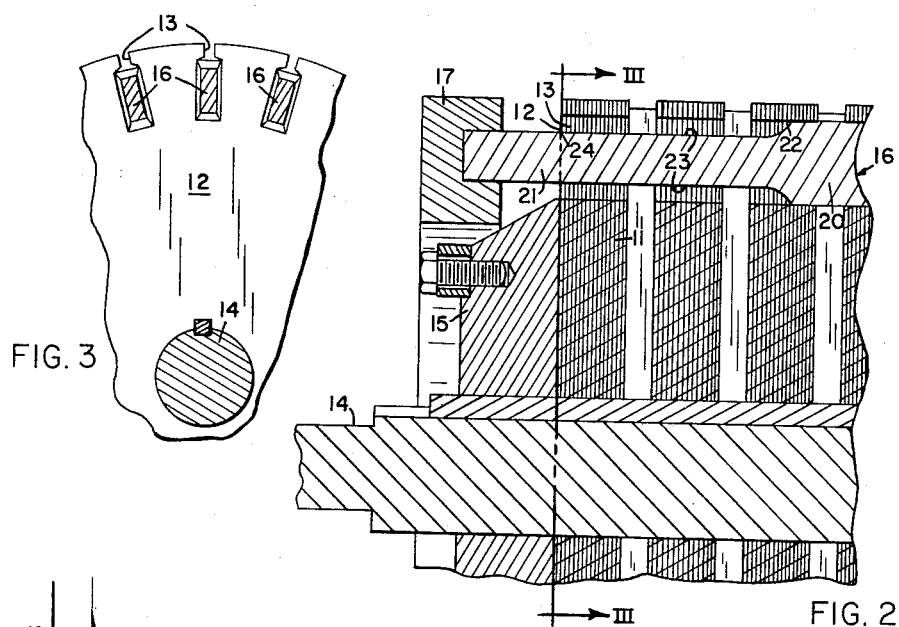
FIG. 3
FIG. 2
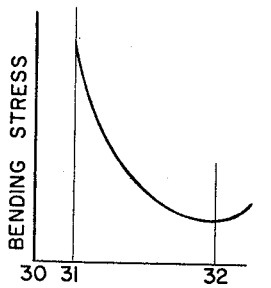
FIG. 4
INVENTOR.
EUGENE W. BARTH
BY Herman Seid
ATTORNEY though the bar. For example, it has been found that
the temperature of the radially outer surface of the rotor
bar is frequently substantially above that of its radially
inward surface due to a current density gradient which
exists through the rotor bars of an induction motor.
These forces and moments are especially large during
startup of a fully loaded induction motor due to the high
starting currents which flow through the rotor bars. In
addition, centrifugal force and temperature rise tend to
expand the end ring and force the rotor bars outwardly
in opposition to the tendency of the bar to bow inwardly
due to the radial temperature gradient. These opposing

United States Patent Office 3,134,040
Patented May 19, 1964

3,134,040
DYNAMOELECTRIC MACHINES WITH PROTECTION FOR SQUIRREL CAGE EXPANSION
Eugene W. Barth, Verona, Pa., assignor to Carrier Corporation, Syracuse, N.Y., a corporation of Delaware
Filed June 7, 1960, Ser. No. 34,503
10 Claims. (Cl. 310—211)

This invention relates to dynamoelectric machinery and more particularly to dynamoelectric machines such as induction motors which employ rotor bars which are subject to breakage under conditions encountered in operation.

A dynamoelectric machine of the induction type such as an induction motor frequently utilizes rotor bars of copper or other electrically conductive material positioned in slots in the rotor core. The rotor bars are generally joined electrically to each other by means of an end ring which is welded or brazed to the ends of the rotor bar projecting from the rotor core of the machine. While this construction lends itself to simple fabrication and assembly providing low initial cost, breakage of the rotor bars is a frequent cause of failure after such a machine has been in service for a period of time. After a number of years of service, an induction motor may fail due to breakage of the rotor bars which frequently occurs at a region between the end of the rotor core and the end ring. The problem of rotor bar breakage is accentuated by the brazing or welding operation by which the end ring is secured to the rotor bars because the heat applied during the operation tends to reduce the mechanical strength of the bar material in the area of the end ring.

While the breakage of a few rotor bars may sometimes be tolerated, the electrical efficiency of the motor or other machine is thereby correspondingly reduced and after a number of bars have broken, a point is often reached where the machine becomes unsatisfactory in the service for which it was designed. It then becomes necessary to dismantle the machine and completely re-bar the rotor. Consequently, the cost of operation of the machine is substantially enlarged by the necessity for periodic overhauls.

One approach which has been suggested to the problem of rotor bar failure has been to fabricate the rotor bars from high strength copper alloys. However, the use of high strength alloys has proved unsatisfactory due to the rotor bars being weakened by the heat conducted to the bar during even carefully controlled brazing of the end ring to the ends of the bars.

Analysis of the stresses imposed on the rotor bars in an induction machine has disclosed that the forces and moments which tend to cause the bars to break assume very significant proportions especially when the machine is accelerated as during startup of a fully loaded motor. The forces and moments are due in part to the effect of the thermal linear and volumetric expansion of the bars caused by a temperature differential which exists radially through the bar. For example, it has been found that the temperature of the radially outer surface of the rotor bar is frequently substantially above that of its radially inward surface due to a current density gradient which exists through the rotor bars of an induction motor. These forces and moments are especially large during startup of a fully loaded induction motor due to the high starting currents which flow through the rotor bars. In addition, centrifugal force and temperature rise tend to expand the end ring and force the rotor bars outwardly in opposition to the tendency of the bar to bow inwardly due to the radial temperature gradient. These opposing forces and moments cause very great stresses to exist along the end portion of the bars. However, it has been found that merely providing a clearance between the top and bottom of the bar and the core slot is insufficient to materially reduce bar breakage because the bar tends to twist and bend sidewise due to the inertial forces and twisting moment imposed on it. Consequently, the bar becomes tightened in the slot and the stresses in the bar tend to produce bar breakage. In addition, the inertial forces on the rotor bars during startup of a fully loaded motor assume significant proportions and cause stresses to be set up in the rotor bars which likewise contribute to their eventual failure.

Analysis of dynamoelectric machinery of the type described has further shown that it is insufficient to reduce the magnitude of the stresses in the rotor bar to a relatively safe value at the point of their connection to the end ring. It has been discovered that in operation rotor bar failures generally occur at a point outside the rotor core but somewhat spaced from the end ring. Further analysis of the problem has disclosed that while the stresses at the brazed joint between the end ring and rotor bar may be reduced to a safe value by a proper design, nevertheless, the stresses at some intermediate region in the rotor bar between the end ring and the rotor core may be substantially greater than those at the end ring and sufficient to cause breakage of the bars and consequently, failure of the machine in service. Consequently, in many instances rotor bar failures have resulted from low-cycle fatigue; i.e., the bar material has been intermittently subjected to a stress level exceeding the proportional limit of the material at the prevailing temperature. Under these conditions, the bar deforms plastically and eventually cracks form and propagate until the bar section which remains intact becomes too small to carry the applied loads, at which time complete fracture ensues.

Accordingly, it is an object of this invention to provide an improved dynamoelectric machine wherein the stresses tending to cause breakage of its rotor bars are reduced.

It is a further object of this invention to provide an improved rotor bar for a dynamoelectric machine.

This and other objects of this invention are achieved in the illustrated embodiment by providing a clearance between the rotor bar and its associated core slot for a substantial distance along the length of the rotor bar between the end of the core and extending inwardly thereof. The clearance provided permits the rotor bar to flex in a complex fashion over a substantial portion of its length and reduces the magnitude of the bending stresses imposed on it to a relatively safe value. At the same time, the central portion of the rotor bar is maintained in relatively tight engagement in the core slot thereby facilitating assembly of the machine and maintaining the bar in its proper position while in service. The features of this invention will become more apparent by reference to the following specification and attached drawings wherein:

FIGURE 1 is a plan view of a rotor of a dynamoelectric machine constructed in accordance with this invention with portions broken away to show the clearance between the rotor bar and the rotor core;

FIGURE 2 is a longitudinal cross section through a part of the rotor member of a dynamoelectric machine taken substantially along line II—II of FIGURE 1.

FIGURE 3 is a partial cross-sectional view taken substantially on line III—III of FIGURE 2; and FIGURE 4 is a typical graph showing the maximum combined bending stress at a particular point along a rotor bar for various flexible bar lengths.

Referring particularly to the drawings, there is shown in FIGURE 1, the rotor member 10 of a dynamoelectric machine provided with an electrical winding of a type referred to in the art as a "squirrel cage" winding which comprises a plurality of rotor bars 16 and a pair of end rings 17. Rotor 10 comprises a core 11 having axially extending slots 13 spaced about the periphery thereof. As can be seen in FIGURE 3, slots 13 are generally rectangular in cross section and have a narrow top portion exposed to the exterior of the rotor core. Disposed within each of slots 13 is a rotor bar 16 which comprises an axially elongated bar of electrically conducting material such as copper or a suitable copper alloy. Rotor bars 16 project outwardly from both of the ends 12 of core 11 and are joined together by end rings 17 which are welded or brazed to the rotor bars. End rings 17 are also of electrically conducting material and together with rotor bars 16 form the squirrel cage rotor winding of a dynamoelectric machine such as an induction motor. Core 11 generally comprises a plurality of laminations or slotted punchings clamped together by end plate 15 and secured to rotor shaft 14 of the machine.

Rotor bars 16 are generally rectangular in cross section as can be best seen in FIGURE 3. In the illustrated embodiment, the rotor bars comprise a central portion 20 of predetermined dimensions and axially aligned end portions 21 which are relieved in exterior size about their perimeter to a smaller size than the central portion. Central portion 20 of rotor bar 16 includes the axially transverse centerline of the bar and is generally made with a slight clearance so that it may be easily inserted within core slot 13. However, because of the slight staggering of the laminations which form core 11, central portion 20 of bar 16 generally fits relatively tightly into its associated core slot. A relatively tight fit between central portion 20 and slot 13 is desirable because it maintains rotor bar 16 in the proper position during assembly of the dynamoelectric machine and particularly during brazing of end rings 17 to the rotor bars. In addition, the tight fit between central portion 20 and slot 13 assures that the rotor bars will maintain their proper position in the dynamoelectric machine during operation thereof.

In the embodiment of this invention illustrated in the drawing, each rotor bar is provided with a relieved portion about its entire perimeter 23 for a substantial portion of its length at both ends of the rotor bar. The relief provided is sufficient to assure that a clearance exists between the rotor bars and their respective core slot walls under twisting, bending and expansion of the ends of the bar in the core slot during startup and operation of the machine. The clearance provided permits the bar to flex and therefore relieves the high stresses which might otherwise cause breakage of the bar.

In the illustrated embodiment, a portion of each end of rotor bar 16 extending from a region 22 spaced from the midpoint or axially transverse centerline of the rotor bar and extending toward the end of the bar is relieved in size about the entire perimeter 23 thereof. Consequently, a clearance exists between perimeter 23 of the rotor bar and the interior walls of slot 13 which allows end portion 21 of the rotor bar to flex within the slot. Relieved portion 23 extends from region 22 to the end of rotor bar 16. However, it is only necessary to relieve rotor bar 16 from region 22 to a region 24 on bar 16 which is adjacent the end 12 of core 11 to achieve the desired flexibility of the bar.

It has been found convenient to provide the desired rotor bar relief by first forming the rotor bar having an overall dimension corresponding to that of portion 20 thereof and thereafter etching and machining away portions of the bar between regions 22 and 24. Since the depth of the relief required is relatively small, the reduced size of portion 21 of rotor bar 16 has been exaggerated in the drawings for purposes of illustration. In actual practice, for a bar 3/16" x 2" in cross section, it is generally sufficient to remove about .005" to .015" of rotor bar width and about 1/8 of radial depth from each respective face thereof to provide the required relief. The relief provided is generally in addition to the amount by which the bar is made undersize to facilitate insertion thereof into the core slots. It is important, however, that end 21 of the rotor be relieved about its entire perimeter so that no portion of the relieved end of the bar is normally in contact with the walls of core slot 13 under any condition of operation of the machine so that the relieved end of the bar may deflect freely within the slot. As long as sufficient relief is provided at the ends of the rotor bars to give the required clearance between the bar and the walls of the core slot, the depth of the relief is not critical and substantially more material than necessary may be removed. However, it will be appreciated that the effective cross-sectional area of the entire rotor bar is limited by that of relieved end portion 21 and consequently, the cross section of end portion 21 must be sufficient to carry the current required by that leg of the rotor winding of the dynamoelectric machine.

It will be understood that the cross-sectional configuration of rotor bar 16 is not critical and may assume any desired form as may the cross-sectional shape of the flexible relieved end portion 24. Consequently, it is not necessary that each face of the rotor bar be relieved uniformly either in size or shape. As an example, central portion 20 of rotor bar 16 might be rectangular in cross section while flexible end portion 21 of the rotor bar could be circular, square, trapezoidal, or rectangular in configuration providing that flexible end portion 21 is relieved in exterior size about its entire perimeter from the corresponding exterior dimension of central portion 20 to provide a clearance space with core slot 13.

As an alternative arrangement, it is feasible to construct rotor bar 16 of uniform cross section throughout its length and enlarge the size of core slot 13 from a region spaced from the midpoint of core 11 to the end thereof. By this means, a clearance would be provided between the rotor bar and the core slot from a region on the core (corresponding to region 22 on the rotor bar) to the end 12 of core 11. However, from a manufacturing point of view, it is preferable to relieve the rotor bar as shown in the drawings rather than to complicate the construction of the core.

The flexible length of rotor bar 16 is defined as the length of the rotor bar from end ring 17 to the region at which a clearance no longer exists between bar 16 and the walls of slot 13. The flexible length, therefore, is the distance from the end ring to the central portion of the rotor bar and is the length which is effectively relieved and capable of flexing. It has been found that there is an optimum flexible length for the rotor bars of a dynamoelectric machine of a given geometry. The provision of any flexible length to a rotor bar greater than the distance between end 12 of core 11 and the nearest face of end ring 17, results in some reduction in stresses. Within limits, an increase in the flexible length of the rotor bar produces a further reduction in stresses. However, a point is reached where the provision of further flexible length on rotor bar 16 results in an increase in stress due to centrifugal and inertial forces.

FIGURE 4 shows a typical graph of stresses at a given region on a rotor bar plotted against various flexible lengths for the rotor bar. In FIGURE 4, the distance between lines 30 and 31 represents the distance between end ring 17 and region 24 or end 12 of core 11. The provision of a relieved portion on rotor bar 16 between these two regions does not materially reduce rotor bar stresses. As further flexible length, up to a length corresponding to line 32, is provided on the rotor bar, the stresses imposed on the bar during startup and operation of the dynamoelectric machine are correspondingly reduced. Further relief beyond the region represented by line 32 results in an increase in stresses in the rotor bar due to centrifugal forces acting through a longer moment arm. The length represented by line 32, therefore, represents an optimum flexible length for a machine having the geometry for which the curve of FIGURE 4 was plotted. The stress represented by the curve shown in FIGURE 4 is the maximum combined bending stress which exists at a particular point along the axis of the rotor bar. However, it will be found that plotting a similar curve for any point between end rings 17 and end 12 of core 11, will produce a similarly shaped curve although somewhat shifted from the curve shown in FIGURE 4.

In order to design a dynamoelectric machine embodying this invention, it is preferable to plot a family of curves, such as shown in FIGURE 4, by computing the maximum combined bending stress at various points along a rotor bar of the machine for various flexible bar lengths. In computing the stresses on a rotor bar, it is necessary to take into consideration bar and end ring geometry and the forces and moments acting on the bar due to radial and axial thermal gradients, rise in temperature of the end ring during operation, shaft speed and acceleration. The net effect of these forces and moments in a machine made in accordance with this invention is a complex deflection of the ends of the bar which includes linear and volumetric expansion, twisting and lateral and radial motions within the core slot rather than breakage of the bar as experienced when a confined bar is employed as in the prior art constructions. A flexible length may be chosen such that the maximum stress at any point along the bar is less than the permissible value of working stress of the bar material for the prevailing temperatures and preferably as close to the optimum value as possible. In most instances, the selection of an actual flexible length for the rotor bars of a particular dynamoelectric machine will be limited by the permissible reduction in the length of central portion 20 of the bar. Since as previously described, it is necessary for the rotor bars to be held relatively tightly in core slot 13 both during assembly and operation of the machine, it is consequently necessary to provide sufficient length for central portion 20 of each bar to insure that the rotor bars will not slip out of position. It has been found in practice that a satisfactory length for the flexible or effectively relieved portion of a rotor bar may lie between 25% to 40% of the total length of the bar at each end thereof. Generally speaking, a flexible length of about one-third of the total length of the bar at each end of the bar will produce a satisfactory reduction in stresses while at the same time leaving a satisfactorily long central portion to tightly secure the bar in the core slot. In other words, each relieved portion may extend from a region spaced one-sixth of the total bar length from the axially transverse centerline of the bar to the end of the bar. It will be understood that it is immaterial in computing the flexible length of a rotor bar whether that portion of the bar between the end of the core and the end ring is actually relieved or not, since flexing of the bar over this distance is unrestricted and this portion is effectively relieved and therefore flexible regardless of its geometry. Likewise, that portion of the rotor bar which may project into the end ring is disregarded in considering the length of the bar or its relieved portion.

Assembly of a dynamoelectric machine in accordance with this invention is accomplished in the conventional manner. Laminations or punchings which comprise core 11 are assembled on shaft 14 and usually are secured in splined engagement therewith. Rotor bars 16 may be relieved about their entire circumference by etching, shaving, machining, grinding or any other suitable means. If desired, one process, such as grinding, may be used to relieve the top and bottom surfaces of the rotor bar and another process such as etching or shaving may be used to provide the relatively smaller relief required on the sides of the rotor bar. Rotor bars 16 are driven into slots 13 until they have reached the proper position in the rotor core. End rings 17 may then be brazed or otherwise secured to the flexible ends of the rotor bars.

In operation, stresses which would normally tend to cause fatigue cracks and eventual breakage of the rotor bars at a point near end rings 17 are reduced by permitting a complex deflection of the rotor bar throughout its flexible length and therefore, the stresses do not assume a magnitude at any one point therealong sufficient to cause failure of the rotor bar, provided that the rotor bar has sufficient flexible length and clearance to reduce the magnitude of the stresses to a safe value. It will be seen that by the practice of this invention, the flexible ends of the rotor bar are permitted movement in all directions and hence, any forces or moments, whether they be centrifugal, inertial or thermal in origin, which would otherwise cause the bar to break if concentrated between the end of the core and the end ring, are relieved. Consequently, one of the serious problems confronting the designer of a dynamoelectric machine of the type employing rotor bars is simply and inexpensively overcome and the life of the machine significantly improved.

While for purposes of illustration, I have described a preferred embodiment of this invention, it will be understood that it is not limited to the described form but that various equivalent configurations and arrangements, falling within the scope of the appended claims, will occur to those skilled in the art.

I claim:
1. In a dynamoelectric machine of the type having a rotatable core member with an electrical winding carried thereby, said winding comprising a plurality of rotor bars of electrically conductive material positioned in a corresponding plurality of axial slots of uniform cross-sectional shape in said core member, said bars projecting from an end of said core and being electrically joined to each other by an end ring, the improvement comprising said bars being relieved about their end portions to define a clearance space between said bars and the walls of said slots, said clearance space extending completely about the perimeter of said bars from a region adjacent the end of said core member to a region inwardly of the end of said core member, said clearance space being of sufficient size and shape so that said bars are enabled to flex in said slots in all directions under the influence of forces and moments imposed on said bars during acceleration and operation of said dynamoelectric machine.

2. A dynamoelectric machine of the induction type having a rotor member comprising a rotor core with a plurality of axial slots of uniform cross-sectional shape therein, rotor bars of an electrically conductive material positioned in said slots and projecting from the ends of said core member, a pair of end rings secured to said rotor bars to form therewith an induction winding, said rotor bars having a central portion of predetermined dimensions and at least one end portion relieved in exterior size about the entire perimeter thereof from a region on said rotor bar adjacent the end of said rotor core to a region inwardly thereof so as to permit flexure of said end of said bar in said core slot to reduce bending stresses tending to cause breakage of said rotor bars.

3. In a dynamoelectric machine, a rotor member comprising a core having an axial slot therein of uniform cross-sectional shape, a rotor bar positioned within said slot, an end of said rotor bar projecting beyond the corresponding end of said core, said rotor bar having a central portion of predetermined dimensions and a relieved portion about the entire perimeter of said rotor bar extending axially thereof from a region spaced from the axially transverse centerline of said bar to a region outward of end of said core so that said bar is spaced from the walls of said slot between said regions and free to flex in said slot under the influence of centrifugal, inertial and thermal expansion forces and moments imposed thereon during acceleration and operation of said dynamoelectric machine.

4. An axially elongated rotor bar of electrically conductive material adapted to be inserted in a slot in the rotor core of a dynamoelectric machine of the induction type; said rotor bar being thereby subject to breakage due to bending stresses caused by centrifugal, inertial and thermal expansion forces and moments acting on the rotor bar during acceleration and operation of said dynamoelectric machine; said rotor bar being constructed to reduce the breakage caused by said stresses and comprising a central portion having a rectangular cross-section of predetermined dimensions and at least one end portion relieved in exterior size about the entire perimeter thereof, said end portion being relieved from a region spaced from the axially transverse centerline of said bar and extending a substantial distance toward the end thereof so that said central portion of said bar is adapted to be retained relatively tightly in a core slot of uniform cross-sectional shape while the relieved end portion of said bar is spaced from the walls of the core slot of said machine permitting a complex deflection of said end portion of said rotor bar in said core slot to reduce bending stresses tending to cause fracture of said rotor bar.

5. A rotor bar as defined in claim 4 wherein said relieved end portion of the rotor bar extends from said region to the end of said bar and the length of the relieved portion on said end of the rotor bar is substantially equal to one-third of the total length of said bar.

6. A rotor bar as defined in claim 4 wherein the said region from which the bar is relieved is spaced from the midpoint of the axis of said bar by a distance substantially equal to one-sixth of the total length of said bar.

7. A rotor bar as defined in claim 4 wherein the distance between said region from which said bar is relieved and the end of said rotor bar comprises substantially 25% to 40% of the total length of said bar.

8. A dynamoelectric machine comprising a rotor member having a core adapted to be rotated about an axis, means defining a plurality of axial slots in said core, and a plurality of electrically conducting rotor bars located in said plurality of slots and having ends projecting from said core, said rotor bars comprising an electrical winding on said rotor member subject to centrifugal, inertial and thermal stress producing forces and moments, said rotor bars having a central portion in relatively tight engagement with said axial slots and said rotor bars having end portions spaced from the walls of said axial slots about the entire perimeter of the bars from a region adjacent the end of said core to a region inwardly thereof toward said central portion of said bars so as to permit said bars to flex under the influence of said forces and moments along a substantial length thereby reducing the magnitude of bending stresses tending to cause breakage of said bars.

9. A dynamoelectric machine as defined in claim 8 wherein the distance between said region inwardly of the end of said rotor core and the end of said rotor bar comprises substantially 25% to 40% of the total length of said bar.

10. A dynamoelectric machine comprising a rotor member having a core adapted to be rotated about an axis, means defining a plurality of axial slots of uniform cross-section in said core, and a plurality of electrically conducting rotor bars located in said plurality of slots and having ends projecting from said core, said rotor bars comprising an electrical winding on said rotor member subject to centrifugal, inertial and thermal stress producing forces and moments, said rotor bars having a central rectangular portion in relatively tight engagement with said axial slots and said rotor bars having relieved end portions spaced from the walls of said axial slots about the entire perimeter of the bars from a region adjacent the end of said core to a region inwardly thereof toward said central portion of said bars so as to permit said bars to flex under the influence of said forces and moments along a substantial length thereby reducing the magnitude of bending stresses tending to cause breakage of said bars, the distance between said region inwardly of the end of said rotor core and the end of said rotor bar comprising substantially 25% to 40% of the total length of said bar.

References Cited in the file of this patent

UNITED STATES PATENTS

| 885,009 | Behrend | Apr. 21, 1908 |

FOREIGN PATENTS

| 1,013,768 | Germany | Aug. 14, 1957 |